W. F. RICHARDS.
RAILWAY CAR TRUCK.
APPLICATION FILED DEC. 19, 1912.
1,081,405.
Patented Dec. 16, 1913.
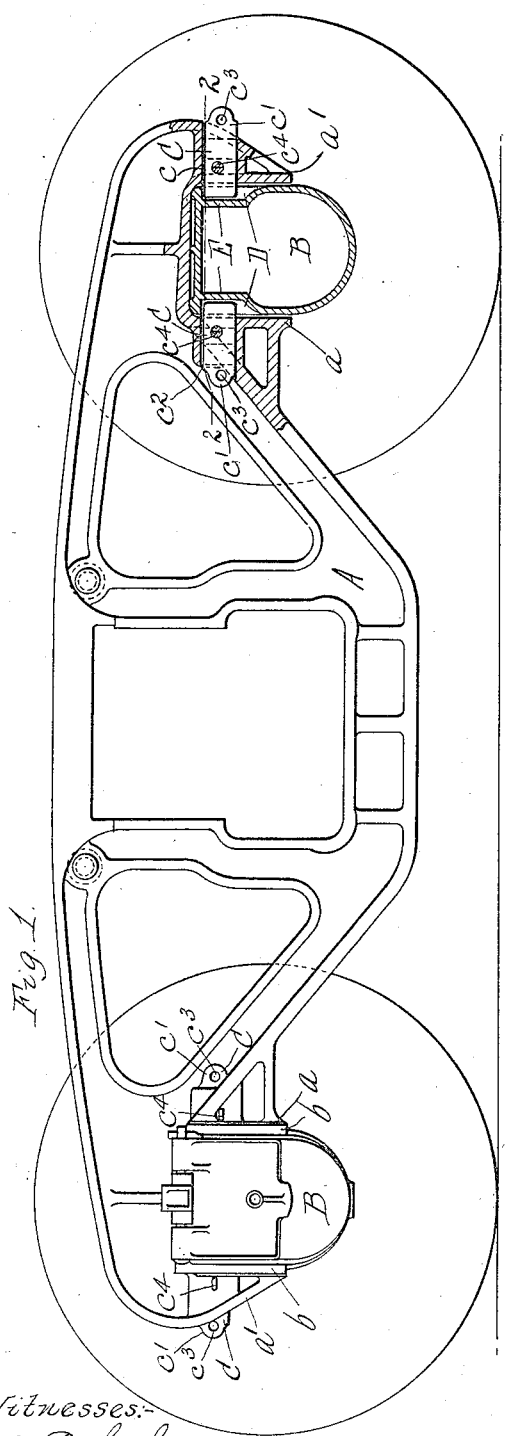
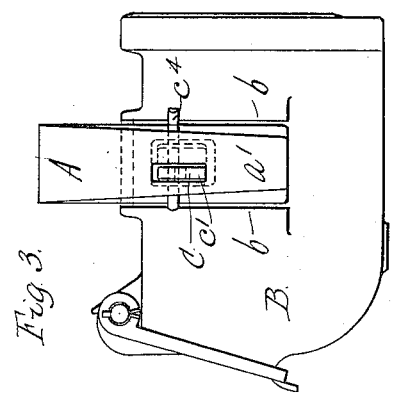
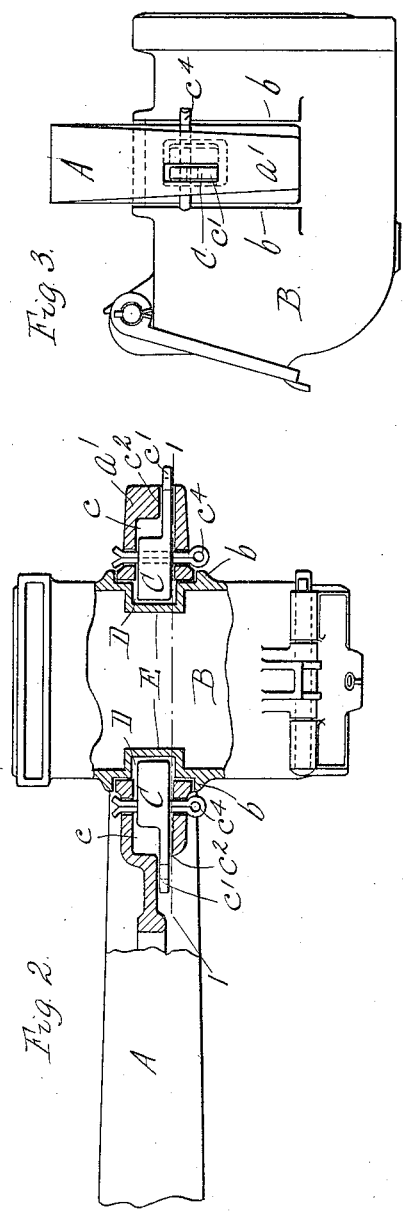

UNITED STATES PATENT OFFICE.

WILLARD F. RICHARDS, OF DEPEW, NEW YORK, ASSIGNOR TO GOULD COUPLER COMPANY, OF NEW YORK, N. Y.

RAILWAY-CAR TRUCK.

1,081,405.   Specification of Letters Patent.   Patented Dec. 16, 1913.

Application filed December 19, 1912. Serial No. 737,590.

*To all whom it may concern:*

Be it known that I, WILLARD F. RICHARDS, a citizen of the United States, residing at Depew, in the county of Erie and State of New York, have invented a new and useful Improvement in Railway-Car Trucks, of which the following is a specification.

This invention relates to car truck side frames, and more particularly to means for securing the journal boxes to side frames of that kind, now well known, which are provided at their opposite ends with integral depending jaws or parts that straddle and hold the journal boxes in place in such a manner that the journal boxes, together with the car wheels and axles, can be readily removed from the truck by raising or jacking up the side frames. Retaining means of some sort are ordinarily provided for preventing the accidental dropping of the journal boxes from between the frame jaws which might otherwise happen, for example, if the truck left the track from any cause.

The objects of this invention are to produce strong and reliable means of simple and inexpensive construction for retaining the journal boxes in the jaws of the side frames, and which can be readily operated at will to secure or release the journal boxes; also to provide holding means of this kind which are adapted for securing journal boxes now in use in the side frames without necessitating any changes in journal boxes; also to improve the construction of devices of this kind in the respects hereinafter specified.

In the accompanying drawings: Figure 1 is a side elevation, partly in section on line 1—1, Fig. 2, of a car truck embodying the invention. Fig. 2 is an enlarged fragmentary plan view thereof partly in section on line 2—2, Fig. 1. Fig. 3 is an end elevation thereof.

Like reference characters refer to like parts in the several figures.

A represents the metal side frame of a car truck which is provided at each end with integral depending portions $a$ $a'$ forming rigid jaws between which a journal box B is held. Except as hereinafter described, the side frame may be of any suitable construction but preferably consists of steel casting of the form shown in the drawings. The side walls of the journal box are provided at their outer faces with ribs $b$, between which the depending jaws $a$ $a'$ of the side frame are adapted to enter for holding the journal box from lateral movement relatively to the frame. Preferably the depending jaws $a$ $a'$ of the side frame do not extend downwardly to the full depth of the journal box, so that the side frame need not be raised or jacked up so high as would otherwise be necessary to permit the journal box to be slipped downwardly out of engagement with the jaws, thus greatly facilitating the removal of the journal boxes, axles and wheels from the car truck. All of these parts, in as far as above described, are of well known construction.

The means employed for retaining the journal boxes in place in the side frames are constructed as follows: C C represent locking blocks or members which are slidably arranged in pockets $c$ in the jaws $a$ $a'$ of the side frame at opposite sides of each journal box, and which are adapted to be slid into recesses D in the sides of the journal boxes for preventing the downward movement of the journal boxes relatively to the side frame. Each of the locking members preferably has a shank or reduced portion $c'$ which project out through a slot $c^2$ in the end of the pocket so that it can be reached for moving the member into and out of its locking position. A hole $c^3$ is shown in the outer end of the shank $c'$ of the locking member in which a tool or other device may be inserted to facilitate the moving of the member into or out of its locking position. The locking member may be held in its locking position by any suitable means, such, for example, as a cotter pin $c^4$ which passes through holes in the locking member, and in the sides of the pocket $c$ which register when the locking member is in its locking position. The shanks $c'$ extending out through holes in the pocket $c$ are not essential to the operation of the locking members since other provision could be made for moving the locking members to secure and release the journal boxes. M. C. B. journal boxes are provided with lugs E projecting inwardly from the opposite sides of the box for retaining the journal brasses in position, and in some make of boxes now in use these lugs are recessed or hollowed out externally to save metal and reduce the weight of the boxes. These boxes can be used in the side frame described without alteration, since the external recesses serve as the recesses D for the reception of the locking members.

In assembling the car parts of the truck, the locking members are inserted into the pockets c before the journal boxes are placed in position between the jaws. The locking members can consequently only be removed from the side frame by first removing the journal boxes, thus preventing the losing of the locking members as long as the car truck is assembled. The cotter pins $c^4$ are only used to retain the locking blocks in locking position. They are not subject to any considerable strain, and if they should be broken or lost, it would still be impossible for the locking blocks to escape from their pockets.

The described means for locking the journal boxes in place on the side frames are very simple and inexpensive in construction and have the advantage that the side frame can be used with journal boxes other than the kind described, if it is not desired to employ the locking means. The journal box described can also be used on side frames not equipped with the locking means described, so that in cases of emergency, either of those parts can be used with corresponding parts as heretofore constructed. The locking members can be made comparatively small in size without sacrificing any strength and are located out of the way, where they are not likely to be injured or broken.

I claim as my invention:

1. A car truck side frame having jaws adapted to straddle a journal box, one of said jaws having a pocket therein, and a locking member which is confined within said pocket and is adapted to be moved into a recess in the journal box for preventing the removal of said box from said jaws, substantially as set forth.

2. A car truck side frame having jaws adapted to straddle a journal box, one of said jaws having a pocket therein, a locking member which is confined within said pocket and is adapted to be moved into a recess in the journal box for preventing the removal of said box from said jaws, and means for retaining the locking member in its locking position, substantially as set forth.

3. A car truck side frame having jaws adapted to straddle a journal box, one of said jaws having a pocket therein, and a locking member slidably arranged in said pocket and adapted to project into a recess in said journal box for preventing the removal of said box from said jaws, said locking member being held against removal from said pocket by the walls of said pocket and by said journal box, substantially as set forth.

4. A car truck side frame having jaws adapted to straddle a journal box, one of said jaws having a pocket therein, and a locking member slidably arranged in said pocket and adapted to project into a recess in said journal box for preventing the removal of said box from said jaws, said locking member having a part projecting out through a hole in said pocket for actuating said locking member, said locking member being held against removal from said pocket by the walls of said pocket and by said journal box, substantially as set forth.

5. The combination of a car truck side frame having jaws, a journal box adapted to be held between said jaws and having an inwardly extending projection and a recess in the outer face of the journal box coinciding with said projection, and locking means on the side frame adapted to enter said recess for holding the journal box in said jaws, substantially as set forth.

6. A car truck side frame having jaws adapted to straddle a journal box, one of said jaws having a pocket therein with an open end facing the journal box and having a smaller opening in one of its walls, a locking member adapted to be inserted into said pocket through said open end and having a reduced extension which projects through said smaller opening, said journal box having a recess into which said locking member is adapted to be moved to hold the journal box in place between the jaws, substantially as set forth.

Witness my hand, this 13th day of December, 1912.

WILLARD F. RICHARDS.

Witnesses:
 DONALD C. DAVIS,
 ALLEN B. BRIMMER.

---

Copies of this patent may be obtained for five cents each, by addressing the "Commissioner of Patents, Washington, D. C."